UNITED STATES PATENT OFFICE.

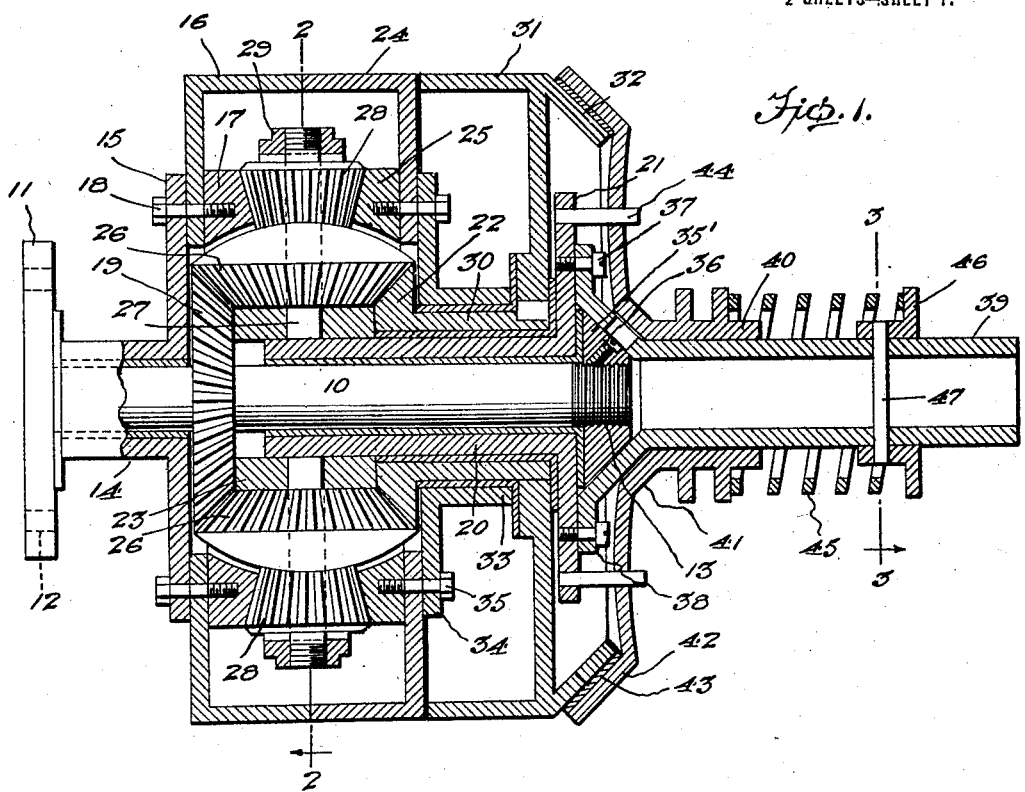

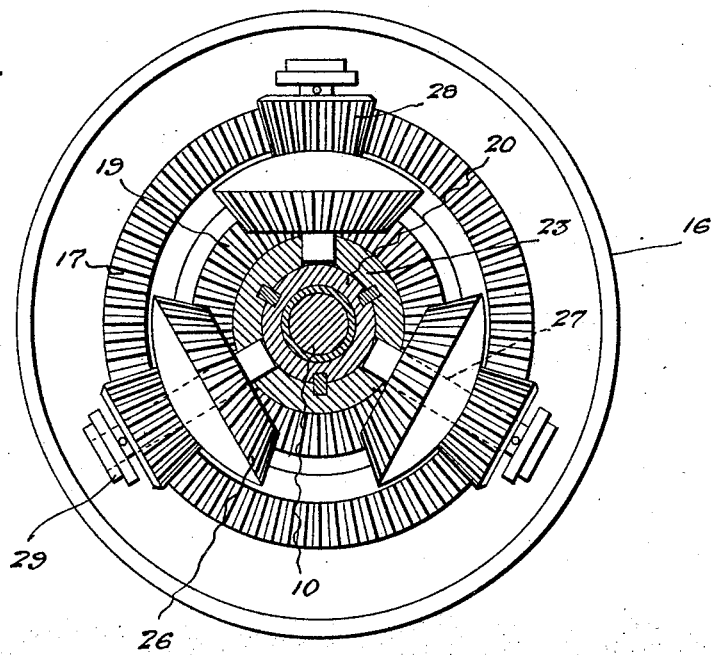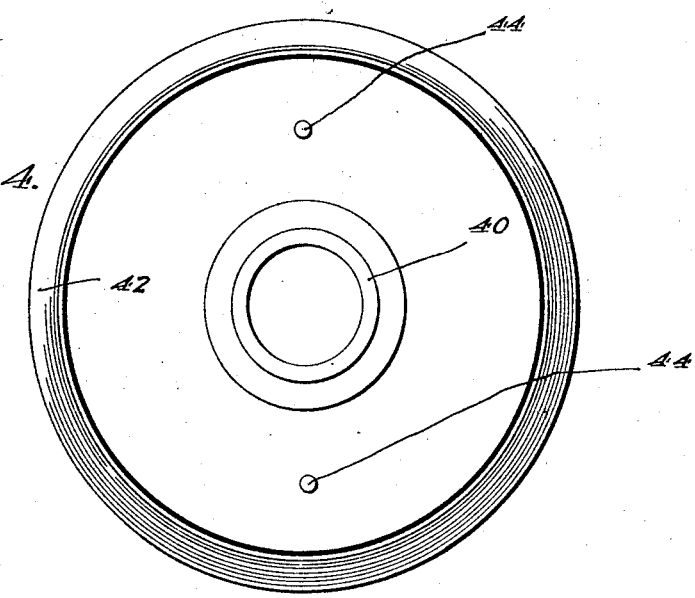

JOHN E. SUGDEN, OF HUB CITY, WISCONSIN.

PLANETARY TRANSMISSION.

1,410,424.  Specification of Letters Patent.  Patented Mar. 21, 1922.

Application filed August 2, 1921. Serial No. 489,173.

*To all whom it may concern:*

Be it known that I, JOHN E. SUGDEN, a citizen of the United States, residing at Hub City, in the county of Richland and State of Wisconsin, have invented new and useful Improvements in Planetary Tranmissions, of which the following is a specification.

This invention relates to transmission devices for automobiles and the like and has for its object the provision of a novel planetary transmission in which the construction is such as to provide three different forward speeds and a reverse.

An important object is the provision of a planetary transmission of this character which consists of but few parts, in fact fewer parts than are provided in the well known planetary transmission used on the Ford automobile and in which only two speeds are provided.

Another object is the provision of a planetary transmission in which all the gears are inclosed within the drums, the latter consequently operating to muffle any noise present, in the gearing, all the gears being furthermore adjustable whereby to take up play and prevent unnecessary back lash.

An additional object is the provision of a transmission of this character which will be comparatively simple and inexpensive in manufacture, highly efficient in use, durable in service and a general improvement in the art.

With the above and other objects and advantages in view, the invention consists in the detals of construction to be hereinafter more fully described and claimed, and illustrated in the accompanying drawings in which, Figure 1 is a longitudinal sectional view through a transmission constructed in accordance with my invention.

Figure 2 is a cross-sectional view therethrough on the line 2—2 of Figure 1.

Figure 3 is a cross-sectional view on the line 3—3 of Figure 1,

Figure 4 is a detail view of the clutch shoes and associated parts,

Referring more particularly to the drawings the numeral 10 designates the drive shaft which is formed at one end with a flange 11 having suitable holes 12 for the passage of securing bolts whereby this drive shaft may be secured to the fly-wheel of the engine, not shown. This shaft 10 is of considerable length and has its other end threaded as shown at 13 for a purpose to be described.

Rotatable upon the shaft 10 is a sleeve 14 which is preferably bushed as shown and formed on this sleeve is a disk member 15 to which is secured a reverse drum 16. Disposed within this reverse drum is a ring gear 17 and this ring gear, the drum and the disk 15 are all secured together by means of studs 18. Secured upon the shaft 10 within the drum 16 is a beveled gear 19 for a purpose to be described.

Disposed in encircling relation to the shaft 10 is a suitably bushed sleeve 20 rotatable thereon and formed at one end with a disk member 21 constituting a driving plate. Rotatable upon this sleeve 20 is a beveled gear 22 similar to the gear 19 and held in spaced relation thereto by a short sleeve 23 which is keyed upon the sleeve 20. Disposed next to the drum 16 is the slow speed drum 24 within which is secured a ring gear 25 similar to the gear 17. Disposed between the gears 19 and 22 are gears 26 which mesh therewith and which are carried by shafts 27 having their inner ends journaled within suitable sockets formed in the sleeve 23. These gears 26 are formed double, that is they carry small beveled gears 28 which mesh with the ring gears 17 and 25. The gears 26 and 28 are held upon the shaft 27 by means of suitable nuts 29 which not only serve as retaining means but which also serve as adjusting means for taking up any play or back lash in the gearing.

Rotatable upon the sleeve 20 is a sleeve 30 upon which is keyed the second speed drum 31 which is formed at its outer or closed side with an inclined flange 32 constituting one element of a clutch device to be described. Rotatable upon the sleeve 30 is a sleeve 33 which is formed with a disk portion through which pass threaded studs 35 which also pass through the drum 24 and gear 25. It should be stated that threaded upon the end 13 of the shaft 10 is an adjusting collar 35 which is for the purpose of adjusting the play between the gears so as to take up back lash. This collar is locked in position upon the threaded end of the shaft 10 by means of a suitable set screw 36.

Secured to the driving plate 21, as by means of suitable bolts or screws 37 is the enlarged end 38 of an elongated sleeve 39 which constitute the transmission or driven shaft. Slidable and non-rotatable upon the sleeve 39 is a collar 40 which is shiftable longitudinally by means of the usual shifting fork not shown.

The inner end of the collar 40 is enlarged as shown at 41 and terminates in a peripheral inclined flange 42 lined or faced with a suitable material indicated at 43 and cooperating with the inclined flange 32 whereby to constitute a clutch device. Extending from the plate 21 are studs 44 slidably engaging through holes in the member 41. The numeral 45 designates a coil spring which surrounds the sleeve 39 and which abuts against the collar 40 and this sleeve is in turn held in position upon the sleeve by a flanged collar 46 engaging the spring and held in position by a transverse pin 47 passing through the collar 46 and through the sleeve 39.

In the actual use of the device it is to be understood that contractile bands must be associated with the drums 16, 24 and 31 in the same manner as such bands are provided in the particular type of planetary transmissions referred to at the beginning of the specification and some suitable pedal or other operated means must be provided for contracting these bands selectively. The bands and the contracting means therefor and likewise the means for shifting the clutch collar 40 are not illustrated as it is believed that they are unnecessary to a proper understanding of the present invention.

In the operation of the device, it will be seen that when the shaft is rotated by the engine, not shown, and a suitable band is contracted about the drum 16 whereby to hold the latter rigid, the drum 24 and sleeve 33 will be rotated carrying along the gear 25 and it is to be seen that all the gears and in fact the entire transmission will be rotated in the opposite direction except the shaft 10 and the parts secured thereto and the drum 16 which is held stationary, but at a decrease of speed and this constitutes the reverse of the drive mechanism.

When the drum 24 is held stationary by means of contracting a suitable band thereabout, the gears 28 will be rolled around the gear 25 in the same direction as the engine shaft carrying along the shaft 27 which is secured to the sleeve 20 and likewise to the shaft 39, and this constitutes the first or low speed of the drive mechanism.

In case the drum 31 which is secured to the gear 22 by the sleeve 30 is held stationary by means of a suitable contractile band, the gears 26 will be rolled around the gear 22 carrying along the shaft 27 which is secured on the sleeve 20, this resulting in driving the shaft 39 in the same direction as described in the second instance but at a greater rate of speed and this constitutes the intermediate or second speed of the transmission device.

In order to effect the direct drive, it is necessary that some suitable clutch lever not shown be shifted to permit the spring 45 to move the collar 40 toward the drum whereupon the flange 42 will be forced into frictional engagement with the flange 32 and this will naturally result in direct drive of the sleeve 39.

From the foregoing description and a study of the drawings it will be readily apparent that I have thus provided a comparatively simple transmission of the planetary type in which I have provided a reverse gear, and three speeds forward all under ready control of the operator whereby all driving requirements may be fulfilled in the matter of speed and depending upon various loads or road conditions. It will be observed that there are but a limited number of gears in this mechanism and that ample means is provided for setting up these gears to remove back lash or excessive play and consequently reduce any noise which might otherwise be noticeable. It is also to be noticed that the construction being simple there is very little to get out of order and it will also be observed that all of the moving parts are bushed so that in the event of wear the bushings may be removed and replaced by new ones so that the mechanism may be easily restored to a practically new condition.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim;

1. A planetary transmission comprising a drive shaft, a reverse drum rotatable upon said shaft, a ring gear within said drum, a gear secured upon said shaft, a low speed drum adjacent said first named drum and rotatable with respect to said shaft, a ring gear within said second named drum, a sleeve rotatable about said shaft and terminating in a driving plate, a gear on said last named sleeve within said second named drum, a spacing sleeve within said last named sleeve and disposed between said second and fourth named gears, said spacing sleeve being formed with bearing sockets, a plurality of double gears having shafts journaled within said sockets, each double gear including a relatively large portion meshing with said second and fourth named gears and further including a relatively small portion meshing with both of said ring gears, a second speed drum rotatable independently of both of said drums and formed with a flange constituting a clutch element, a driven shaft secured to said driving plate, and clutch means carried by said driven shaft and engageable with said flange whereby to effect direct drive.

2. A planetary transmission comprising a drive shaft, a reverse drum rotatable upon said shaft, a ring gear within said drum, a gear secured upon said shaft, a low speed drum adjacent said first named drum and rotatable with respect to said shaft, a ring gear within said second named drum, a sleeve rotatable about said shaft and terminating in a driving plate, a gear on said last named sleeve within said second named drum, a spacing sleeve within said last named sleeve and disposed between said second and fourth named gears, said spacing sleeve being formed with bearing sockets, a plurality of double gears having shafts journaled within said sockets, each double gear including a relatively large portion meshing with said second and fourth named gears and further including a relatively small portion meshing with both of said ring gears, a second speed drum rotatable independently of both of said drums and formed with an inclined flange constituting a clutch element, a driven shaft secured to said driving plate, and clutch means carried by said driven shaft and engageable with said flange whereby to effect direct drive, said clutch means comprising a spring pressed collar slidable upon said driven shaft, and an inclined flange cooperating with said first named flanges.

3. A planetary transmission comprising a drive shaft, a reverse drum rotatable upon said shaft, a ring gear within said drum, a gear secured upon said shaft, a low speed drum adjacent said first named drum and rotatable with respect to said shaft, a ring gear within said second named drum, a sleeve rotatable about said shaft and terminating in a driving plate, a gear on said last named sleeve within said second named drum, a spacing sleeve within said last named sleeve and disposed between said second and fourth named gears, said spacing sleeve being formed with bearing sockets, a plurality of double gears having shafts journaled within said sockets, each double gear including a relatively large portion meshing with said second and fourth named gears and further including a relatively small portion meshing with both of said gears, a second speed drum rotatable independently of both of said drums and formed with a flange constituting a clutch element, a driven shaft secured to said driving plate, clutch means carried by said driven shaft and engageable with said flange whereby to effect direct drive, an adjusting collar threaded upon the extremity of drive shaft and engaging said drive plate whereby to effect adjustment of said second and fourth named gears with respect to the larger portions of the double gears, and means associated with the shaft of the double gears whereby to adjust the latter with respect to the second and fourth named gears and with respect to said ring gear.

In testimony whereof I affix my signature.

JOHN E. SUGDEN.